United States Patent
Morel et al.

(10) Patent No.: US 10,043,395 B2
(45) Date of Patent: Aug. 7, 2018

(54) METHOD FOR PROJECTING IMAGES BY A PROJECTION SYSTEM OF A MOTOR VEHICLE, AND ASSOCIATED PROJECTION SYSTEM

(71) Applicant: VALEO VISION, Bobigny (FR)

(72) Inventors: Xavier Morel, Bobigny (FR); Stephan Sommerschuh, Bobigny (FR); Hafid El-Idrissi, Bobigny (FR); Weicheng Luo, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/720,252

(22) Filed: Sep. 29, 2017

(65) Prior Publication Data

US 2018/0090011 A1   Mar. 29, 2018

(30) Foreign Application Priority Data

Sep. 29, 2016   (FR) ...................... 16 59298

(51) Int. Cl.
*B60Q 1/26* (2006.01)
*B60Q 1/50* (2006.01)
(Continued)

(52) U.S. Cl.
CPC ............. *G08G 1/167* (2013.01); *B60Q 1/26* (2013.01); *B60Q 1/50* (2013.01); *B60Q 1/503* (2013.01);
(Continued)

(58) Field of Classification Search
CPC .............. B60C 1/26; B60C 1/50; B60C 1/503
(Continued)

(56) References Cited

U.S. PATENT DOCUMENTS 9,481,287 B2 * 11/2016 Marti ...................... B60Q 1/00
2012/0044090 A1   2/2012 Kahler et al.
(Continued)

FOREIGN PATENT DOCUMENTS

| EP | 2 689 966 A1 | 1/2014 |
| EP | 2 896 937 A1 | 7/2015 |
| GB | 2482951 A | 2/2012 |

OTHER PUBLICATIONS

French Preliminary Search Report dated Jun. 22, 2017 in French Application 16 59298 filed on Sep. 29, 2016 (with English Translation of Categories of Cited Documents).

*Primary Examiner* — William C Dowling
(74) *Attorney, Agent, or Firm* — Oblon, McClelland, Maier & Neustadt, L.L.P.

(57) ABSTRACT

A method for projecting at least one image, by a projection system of a motor vehicle comprising a device for detecting an event, an estimation device capable of estimating the time taken to reach the event, a processing unit capable of generating a control signal, a projection device capable of receiving the control signal and projecting digital images, and a storage unit storing at least one image representative of a pictogram. The method includes detecting an event, estimating the time taken to reach the event, selecting at least one image representing a pictogram characteristic of the detected event, and establishing a sequence of images representing an animation of the pictogram. The sequence of images is paced depending on the time estimated in estimation, and projecting the sequence of images onto the roadway.

20 Claims, 14 Drawing Sheets

(51) Int. Cl.
  *G08G 1/16* (2006.01)
  *H04N 9/31* (2006.01)
  *B60K 35/00* (2006.01)

(52) U.S. Cl.
  CPC .............. *H04N 9/31* (2013.01); *B60K 35/00* (2013.01); *B60K 2350/2052* (2013.01); *B60Q 2400/50* (2013.01)

(58) Field of Classification Search
  USPC ..................................................... 353/12–14
  See application file for complete search history.

(56) References Cited

U.S. PATENT DOCUMENTS

| | | |
|---|---|---|
| 2014/0028980 A1 | 1/2014 | Othmer |
| 2014/0204201 A1 | 7/2014 | Norman |
| 2015/0203023 A1 | 7/2015 | Marti et al. |
| 2017/0262710 A1* | 9/2017 | Kozuka ................... B60Q 1/26 |
| 2018/0056854 A1* | 3/2018 | Kunii ....................... B60Q 1/26 |

* cited by examiner

METHOD FOR PROJECTING IMAGES BY A PROJECTION SYSTEM OF A MOTOR VEHICLE, AND ASSOCIATED PROJECTION SYSTEM

The present invention concerns the field of motor vehicle lighting.

In particular, the invention concerns a method for projecting images onto the roadway and a projection system of a motor vehicle.

Driving by night is more difficult than driving by day. Road signs can only be seen when they are within the area illuminated by the headlights. Driving by night is therefore difficult and tiring. This difficulty can be exacerbated when the driver needs to navigate an unfamiliar route. The voice navigation system of the global positioning system (GPS) does not always provide adequate assistance, and taking one's eyes off the road to look at the GPS screen is impractical.

Also, it is desirable to provide night driving assistance that facilitates the reading of road signs or driving on an unfamiliar route.

To this end, the invention concerns a method for projecting at least one image, by a projection system of a motor vehicle comprising a device for detecting an event, a processing unit capable of generating a control signal, a projection device capable of receiving the control signal and projecting digital images, and a storage unit storing at least one image representative of a pictogram. The projection method comprises the following steps:
  a) detecting an event,
  b) estimating the time taken to reach the event,
  c) selecting at least one image representing a pictogram characteristic of the detected event, and
  d) establishing a sequence of images representing an animation of said pictogram, said sequence of images being paced depending on the time estimated in step b); and
  e) projecting of said sequence of images onto the roadway.

According to specific embodiments, the projection method according to the invention comprises one or more of the following features:
  the projection method further comprises the following steps:
    capturing an image of the driver of the motor vehicle and determining the position of the driver in a predefined reference frame referred to as the projection reference frame Rp,
    calculating a transformation matrix M depending on the determined position of the driver,
  said sequence of images being established from said at least one selected image, said transformation matrix and predefined parameters;
    said animation comprises at least the pivoting of the pictogram relative to a horizontal axis perpendicular to the direction of travel of the vehicle;
  the projection method comprises a step of adding at least one area of shadow to said at least one selected image such that the pictogram is perceived in 3D by said driver;
  the animation shows the pictogram increasing in size;
  the animation shows a displacement movement of the pictogram;
  the animation comprises an over-intensification or under-intensification of at least a portion of an image of the sequence of images;

The event is an event chosen from an approaching junction, dangerous bend, speed bump and motorway exit.
  the detection device is a geographical location device of the vehicle in which the event is an indication of the path to be followed in order to complete a route selected by the driver.
The method further comprises a step of capturing an image of the driver of the motor vehicle, and the step of determining the position of the driver in a predefined reference frame referred to as the projection reference frame (Rp) is implemented using the captured image.

The invention also concerns an image projection system of a motor vehicle, said projection system comprising:
  a device for detecting an event,
  a device for estimating the time taken to reach the event,
  a storage unit suitable for storing at least one image representing a pictogram characteristic of an event,
  a processing unit capable of selecting, from the storage unit, at least one image representing a pictogram characteristic of the detected event, the processing unit being designed to establish a sequence of images representing an animation of said pictogram, said sequence of images being paced depending on the time estimated by the estimation device, and
  a projection device capable of projecting said sequence of images onto the roadway.

According to specific embodiments, the projection system according to the invention comprises one or more of the following features:
  the processing unit is capable of determining the position of the driver in a predefined reference frame referred to as the projection reference frame from the at least one captured image, the processing unit being capable of calculating a transformation matrix depending on the determined position of the driver, the processing unit being capable of establishing said sequence of images from said at least one selected image, said transformation matrix and predefined parameters;
  the projection device comprises a light source capable of emitting a light beam, an imaging device capable of imaging the sequence of images and a headlamp capable of projecting the sequence of images onto the roadway;
  the system comprises an imager capable of capturing an image of the driver of the motor vehicle and the processing unit is capable of searching for the position of the driver in the captured image and of defining the transformation matrix M from the determined position of the driver.

The invention will be more clearly understood upon reading the description that follows, which is provided purely as a non-limiting example, with reference to the figures in which:

FIG. 1 is a schematic view of the projection system, according to a first embodiment of the invention, FIG. 2 is a diagram representing the steps of the projection method, according to a first embodiment of the invention, FIG. 3 is a diagram representing the detail of a step of the method shown in FIG. 2, FIG. 4 is a side view of a vehicle equipped with a projection system, according to a first embodiment of the invention, FIG. 5 is a perspective view of traffic cones that can be imaged by the projection method according to the present invention, and FIG. 6 is a perspective view of a first image of a sequence of images, FIG. 7 is a perspective view of the last image of the sequence of images illustrated in FIG. 6, FIG. 8 is a schematic view of the projection system, according to a second embodiment of the invention, FIGS. 9 to 25 are figures from patent application number PCT/EP2016/071596.

The projection method according to the present invention is implemented by a projection system 2 represented schematically in FIG. 1.

This projection system 2 comprises a device 4 for detecting an event, a device 5 for estimating the time taken for the vehicle to reach the event, a storage unit 6 capable of storing images to be projected, and a processing unit 10 connected to the detection device 4, the estimation device 5 and the storage unit 6.

The detection device 4 is capable of detecting an event. According to the present patent application, an event may be, for example, an approaching junction, a dangerous bend, a speed bump, a highway exit, etc.

The detection device 4 is, for example, a GPS (Global Positioning System) device.

As a variant, the detection device 4 can, for example, consist of a camera capable of filming the road and its edges and an electronic unit provided with image processing software. The camera is capable of acquiring images representing the road and the signs located on the roadside. The electronic unit is connected to the camera. It is designed to detect events from the processing of the acquired images.

The device 5 for estimating the time taken for the vehicle to reach the event comprises, for example, the "GPS" global positioning system already used in the detection device 4.

As a variant, the estimation device 5 comprises a device for measuring the speed of the vehicle and an electronic processing unit connected to the device for measuring the speed of the vehicle and to the detection device 4. In this case, the electronic unit is capable of determining the time taken to reach the event from the vehicle speed and the distance between the vehicle and the event, said distance being given by the detection device 4.

The storage unit 6 is a ROM, UVPROM, PROM, EPROM or EEPROM memory. It is capable of storing images, each of which represents a pictogram.

A pictogram is a graphic sign representative of a situation, the meaning of which is likely to be understood quickly. A pictogram may comprise a figurative drawing and/or alphanumeric symbols. The pictograms are characteristic of the events. They can, for example, represent a symbol of a road sign, lines, guide arrows or traffic cones.

The storage unit 6 is also capable of storing the coordinates of the position of the driver in a predefined reference frame referred to as the projection reference frame Rp. This reference frame Rp is shown in FIG. 4. In particular, the storage unit 6 stores the coordinates of the position of the driver's eyes in this reference frame Rp. This position is an average position established based on the positions of the eyes of multiple drivers of different heights or different body shapes.

The processing unit 10 is a processing calculation unit.

The projection system 2 according to the first embodiment of the invention further comprises a projection device 12 capable of projecting images onto the roadway.

The projection device 12 comprises a light source 16 capable of emitting a light beam, an imaging device 18 capable of imaging a digital image from the light beam originating from the light source 16 and a control signal originating from the processing unit, and a headlamp 20 designed to receive the image imaged by the imaging device 18 and project it onto the roadway.

The light source 16 consists, for example, of a light-emitting diode and a collimator. As a variant, the light-emitting diode is replaced by a laser source.

The imaging device 18 consists, for example, of an array of micro-mirrors. The array of micro-mirrors is generally denoted by the acronym DMD, standing for Digital Micro-Mirror Device. It is connected to the processing unit 10. It comprises a large number of micro-mirrors distributed into rows and columns. Each micro-mirror is suitable for receiving a portion of the light beam emitted by the light source 16 and of reflecting it towards the projection device 20 or towards a light absorber. The set of micro-mirrors is designed to project a digital image.

As a variant, other types of imaging device can be used in the present invention, such as, for example, imaging devices made from MEMS, an LED matrix or an LCD screen.

The headlamp 20 generally comprises an input lens and an output lens. These lenses are made from plastic material and/or from glass.

The output lens is, for example, a convex lens.

A projection device 29 according to a second embodiment is shown in FIG. 8. This projection device 29 is identical to the projection device 2 according to the first embodiment of the invention, apart from the fact that the storage unit 6 does not comprise the coordinates of the position of the driver in the projection reference frame Rp and the projection system comprises an imager connected to the processing unit. The imager is capable of imaging the driver of the motor vehicle. The imager consists, for example, of a camera. The camera of the driver monitoring system can be used. The processing unit is capable of searching for the position of the driver in the captured image by means of image processing. This image processing operation is carried out, for example, using edge detection. In particular, the processing unit searches for the position of the driver's eyes in the captured image. Next, the position of the driver's eyes is defined in a reference frame Rp located on the projection device.

As a variant, the sequence of images represents an animation of a pictogram paced depending on the time estimated by the estimation device 4, but steps 38 to 44 are not implemented. Therefore, the pictograms of this animation do not give the driver the visual impression of being established in a plane different to that of the roadway.

In reference to FIG. 2, the projection method according to the present invention starts with a step 30 of detecting an event, performed by the detection device 4. After detection, the detection device 4 transmits to the processing unit 10 the information that an event has been detected and the information relative to the type of event detected.

During a step 32, the estimation device 5 estimates the time that will be needed by the motor vehicle to reach the event. It transmits this information continuously and in real time to the processing unit 10. Therefore, if the motor vehicle starts to accelerate after a first estimation by the estimation device, the device estimates the time required to reach the event again, and transmits this second estimation to the processing unit 10.

During a step 34, the processing unit selects, from the storage unit 6, at least one image showing a specific pictogram characteristic of the detected event from all of the images stored in the storage unit and depending on the event detected by the detection device 4. The selected image is transmitted from the storage unit 6 to the processing unit 10.

Therefore, when the event relates to roadworks along the edges of the roadway, the processing unit 10 selects an image representative of a row of traffic cones, as shown in FIG. 5. When the event relates to a right turn or to a change in direction towards the right, the processing unit 10 selects an image representative of an arrow, as shown in FIGS. 6 and 7.

During a step 36, the processing unit establishes a sequence of images representing an animation of said pictogram, said sequence of images being paced depending on the time estimated in step 32.

According to a first embodiment of the invention, the animation comprises the pivoting of the pictogram shown in the selected image relative to a horizontal axis A-A and perpendicular to the direction of movement of the motor vehicle, as shown in FIG. 4. For example, FIG. 6 shows the projection onto the roadway of the first image of a sequence of images representing an arrow turned to the right. FIG. 7 shows the projection onto the roadway of the last image of said same sequence of images representing an arrow turned to the right.

In order to produce the visual impression that the image is being pivoted relative to the horizontal axis A-A, the selected image needs to be processed in a particular way. The detail of this particular processing operation is shown in FIG. 3 and is described in detail below.

In reference to FIG. 3, the step of establishing a sequence of images starts with a step 38 during which the position of the driver is determined in the projection reference frame Rp. This determination is carried out by searching for coordinates in the storage unit 6. In particular, the coordinates of the position of the driver's eyes are searched for.

During a step 40, the processing unit 10 calculates a transformation matrix M depending on the position of the driver's eyes in the projection reference frame Rp. This transformation matrix M is designed in such a way as to deform the selected image in such a way that the pictogram can appear, to the driver, to extend in a viewing plane PV different to the plane defined by the roadway.

An example of a plane PV is shown in FIG. 4. By multiplying the transformation matrix M with the selected image, an image is obtained that is deformed in such a way that the driver of the vehicle does not have the impression of viewing an image extending flat on the roadway in the area ZP defined in bold in FIG. 4, but has the impression of viewing an image that appears to extend in the plane PV. In reality, the image is indeed projected onto the area ZP of the roadway.

This plane PV extends at an angle ε relative to the plane of the roadway. The transformation matrix M is a function of said parameter of angle ε. This angle ε is the angle between the plane of the roadway and the plane in which the pictogram appears to the driver.

One way of calculating this transformation matrix was the subject of a previous patent application filed on 13 Sep. 2016 under number PCT/EP2016/071596. This previous patent application has not yet been published. This patent application has been reproduced at the end of the description of this patent application in order to give an implementation example for the present invention.

During a step 42, the processing unit generates a sequence of images that, when projected, gives the visual impression of pivoting the pictogram about the horizontal axis A-A.

This sequence of images is obtained by generating several transformation matrices M having different angles ε and then multiplying said transformation matrices M by the selected image.

The processing unit 10 is designed to pace the sequence of images depending on the time estimated in step 32 such that the visual impression of the speed of pivoting depends on the distance between the vehicle and the event. If the speed of the vehicle increases, the visual impression of the speed of pivoting relative to the horizontal axis A-A is increased.

During a step 44, the processing unit 10 adds areas of shadow to the images of the sequence of images to give the driver the visual impression that the pictogram shown in the transformed image is displayed in 3D. This addition of areas of shadow is carried out using known image processing techniques. The processing unit 10 generates a control signal representative of the sequence of images and transmits it to the imaging device 18.

During a step 46, the projection device 20 projects the series of images onto the roadway paced according to the time estimated by the estimation device 4.

As a variant, step 44 does not need to be carried out.

According to a second embodiment of the invention not shown here, the animation comprises a displacement movement of the pictogram. For example, if the pictogram is an arrow turned to the right, this arrow can be moved from the center of the roadway towards the right. In this case, the selection step 34 comprises a step of selecting several images forming a pre-established sequence representing a movement of the arrow towards the right. The step of establishing the series of images then consists only of pacing these images according to the time estimated by the estimation device 4. Steps 38 to 40 are not implemented in this embodiment.

According to a third embodiment of the invention not shown here, the animation involves the pictogram increasing in size. Similarly, in this case, the selection step 34 comprises a step of selecting several images forming a pre-established sequence of images that show the pictogram increasing in size.

An example of the increase in size is shown in FIG. 5 in the case in which the pictogram shows a traffic cone processed in such a way as to appear visually to the driver to be in a vertical plane.

In the example shown in FIG. 5, the processing unit selects a sequence of images during step 34. Next, a single transformation matrix M having a set angle ε is applied to the images of the selected sequence in order to give the driver the visual impression that the traffic cone extends in a vertical plane. Finally, during a step 36, the images deformed by applying the transformation matrix M are paced according to the time estimated by the estimation device 4.

According to a fourth embodiment of the invention not shown here, the animation comprises an over-intensification or under-intensification of at least a portion of an image of the sequence of images; This over-intensification or under-intensification is produced by selecting a sequence of images comprising images that comprise areas of over-intensification or under-intensification, as in the case of the second or third embodiments.

According to a fifth embodiment of the invention, the detection device 4 is a GPS geographical location device of the vehicle and the event is an indication of the path to be followed in order to complete a route selected by the driver in his or her GPS geographical location system. The detection step 30 and the estimation step 32 are then carried out using the information received from the GPS geographical location device of the vehicle.

According to a sixth embodiment of the invention implemented by the projection system 29 according to the second embodiment of the invention illustrated in FIG. 8, the processing unit 10 controls the imager 8 such that it captures an image of the driver sat in the motor vehicle. The captured image or images are transmitted to the processing unit 10.

Next, the processing unit 10 searches for the position of the driver in the captured image by means of image processing. In particular, the position of the driver's eyes is searched for in the captured image. This image processing operation is carried out, for example, using edge detection. Next, the position of the driver's eyes is defined in a reference frame located on the headlamp 20. This reference frame is referred to as the projection reference frame Rp. It is shown in FIG. 4.

According to a particularly advantageous variant, the contrast profile of the projected pictogram is enhanced relative to the average light environment of the background beam, on which or in which the pictogram is included.

To this end, the edges of the pictogram, from the outside of same towards the inside and in at least one dimension (width or height) of the projection plane of the pictogram, comprise at least two alternating areas in which the intensity differs relative to the average intensity of the background beam, a first area being more intense than or less intense than said average intensity, and the second area being respectively less intense than or more intense than said average intensity. In one embodiment, the second area constitutes the core or central area of the pictogram and is thus bordered, at least in one dimension, by the first area.

This enhances the perception of the driver or third parties of the message represented by the projected pictogram, reducing the time needed to react to the projected message and therefore improving driving safety.

The intensity gradient and the level of intensity applied can be constant or can vary along the pattern in one direction of the dimension of projection in question (width or height; for example, respectively, from left to right or from bottom to top, corresponding to a projection from the near-field of the vehicle towards the horizon). Moreover, this variation can be static or dynamic, i.e. controlled depending on the vehicle's surroundings: for example, depending on the imminence of an event, the contrast can be decreased on increased dynamically, so as to generate a ripple effect in the pattern that is displayed more or less clearly in the background beam and attract the attention of the driver or third parties to the imminence of the event corresponding to the projected pictogram (exit or bend arrow, collision alert, pedestrian crossing the road, etc.). This increases driving safety still further.

These different embodiments can be combined.

Patent application number PCT/EP2016/071596 has been reproduced below.

Said patent application number PCT/EP2016/071596 and its various applications will be more clearly understood upon reading the description that follows and examining the accompanying figures.

Figure 1:
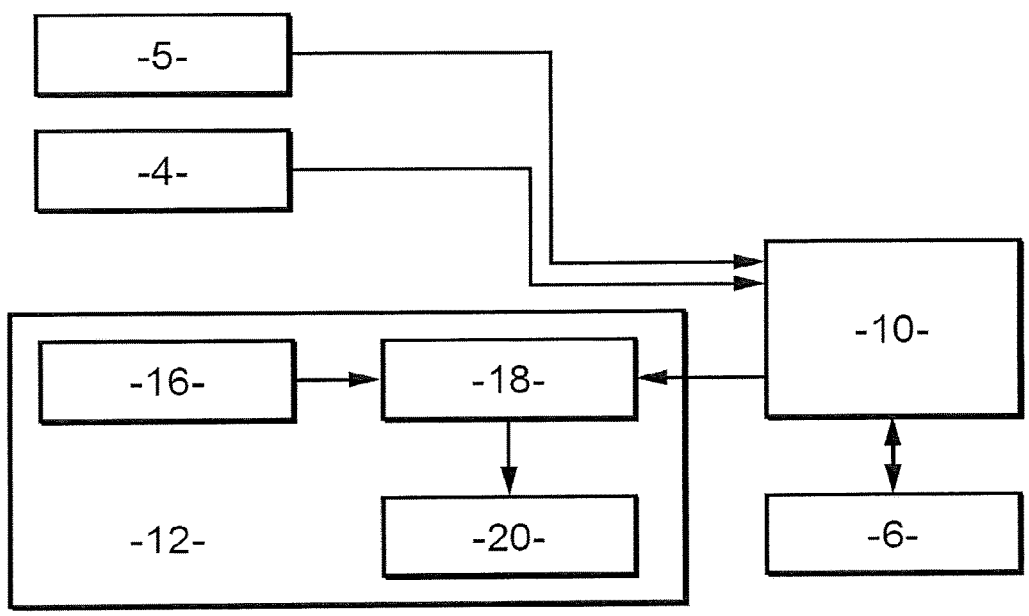
Figure 2:
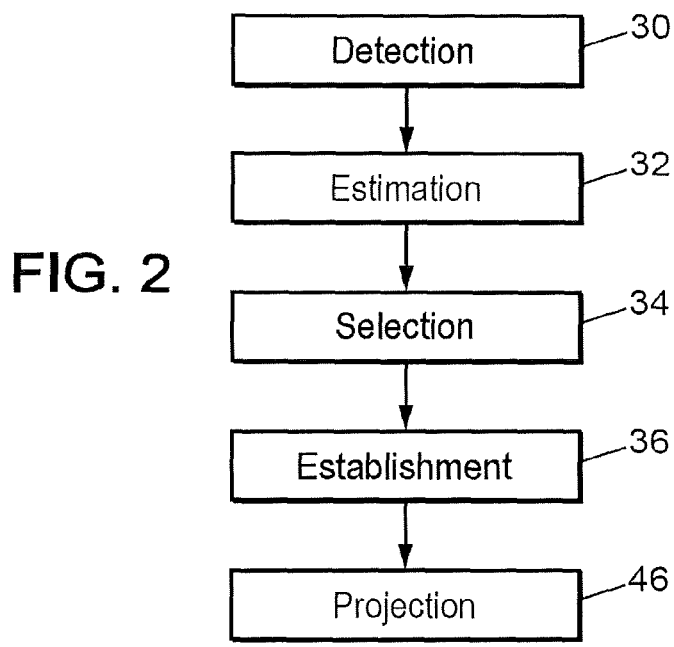
Figure 3:
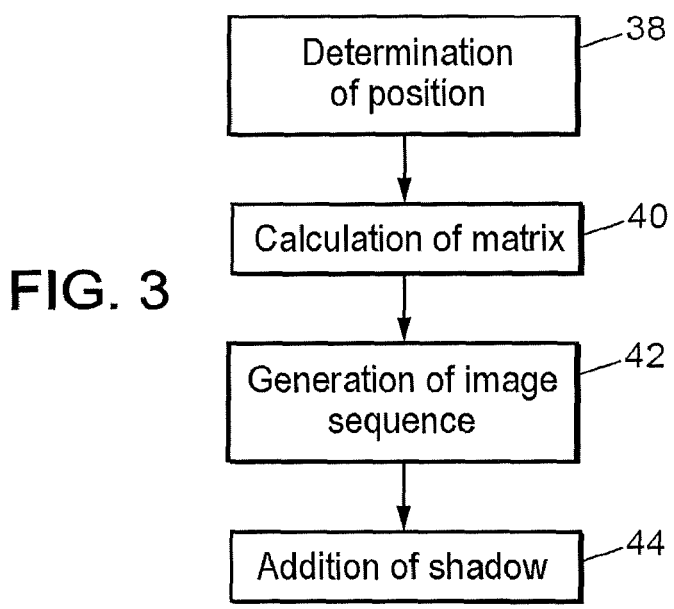
Figure 4:
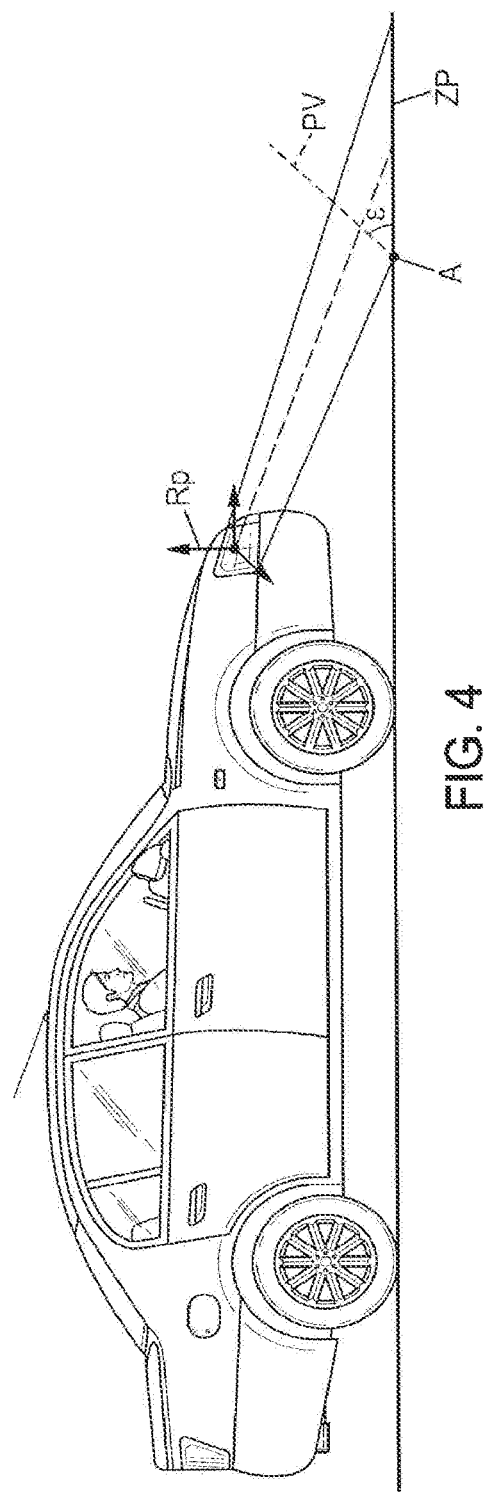
Figure 5:
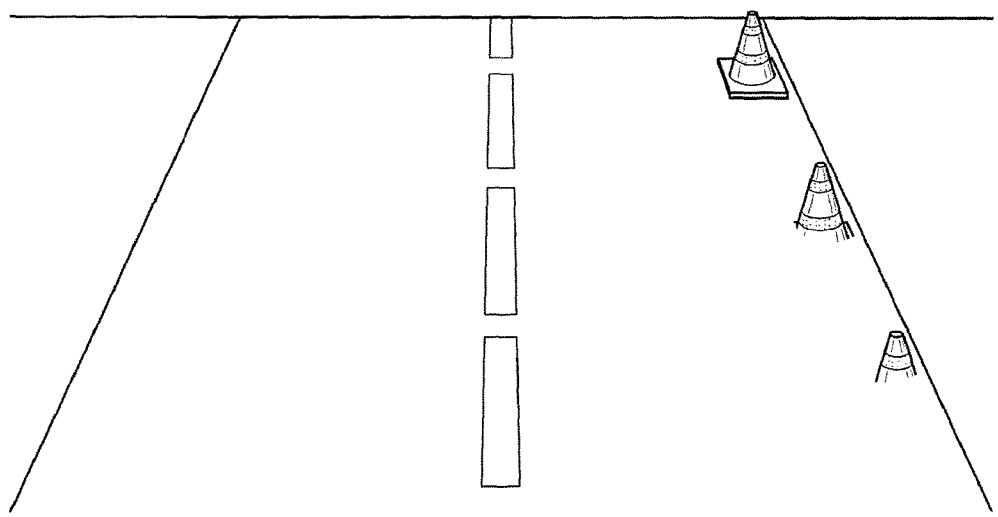
Figure 6:
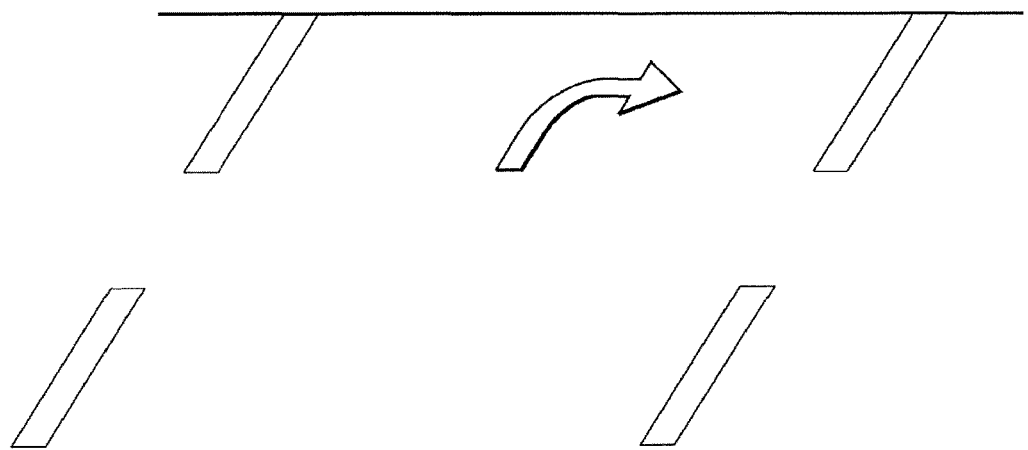
Figure 7:
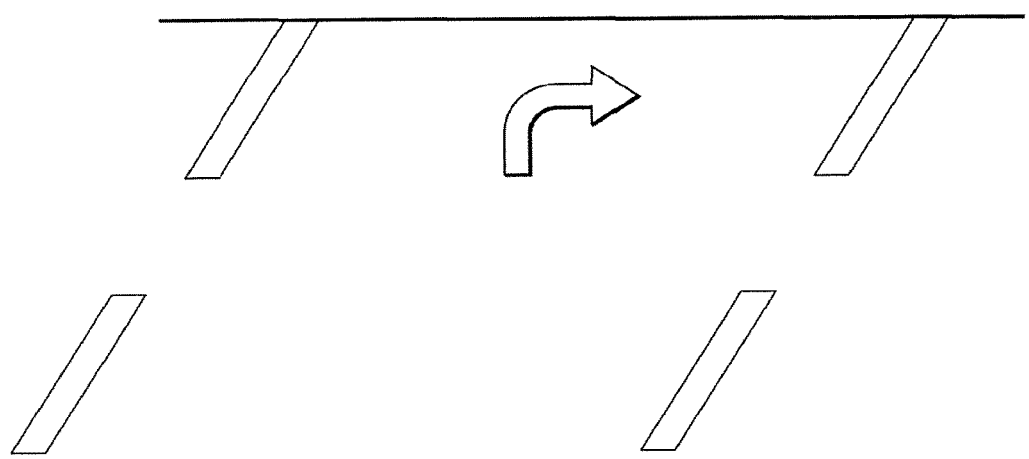
Figure 8:
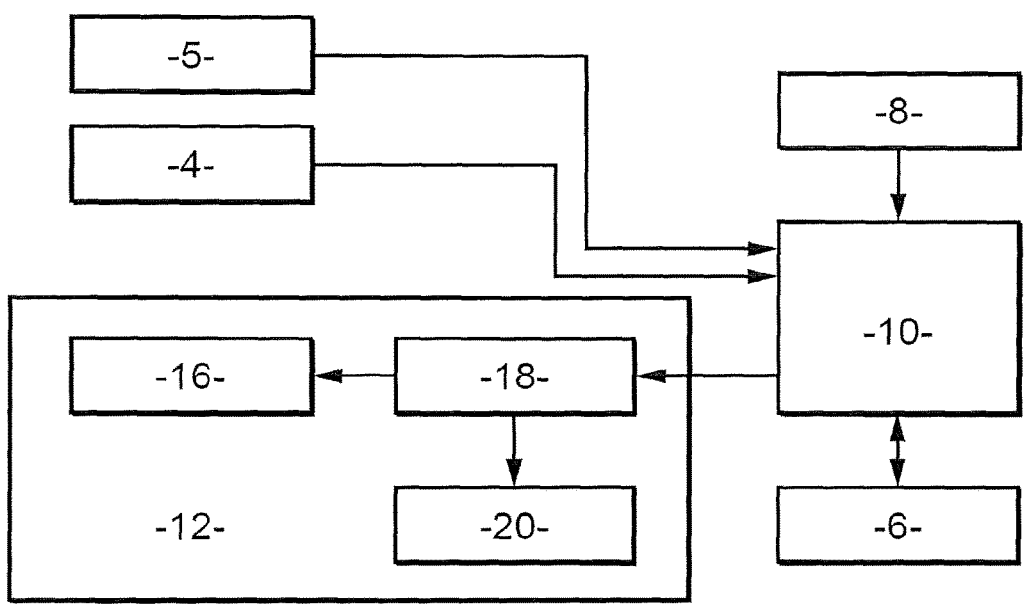
Figure 9:
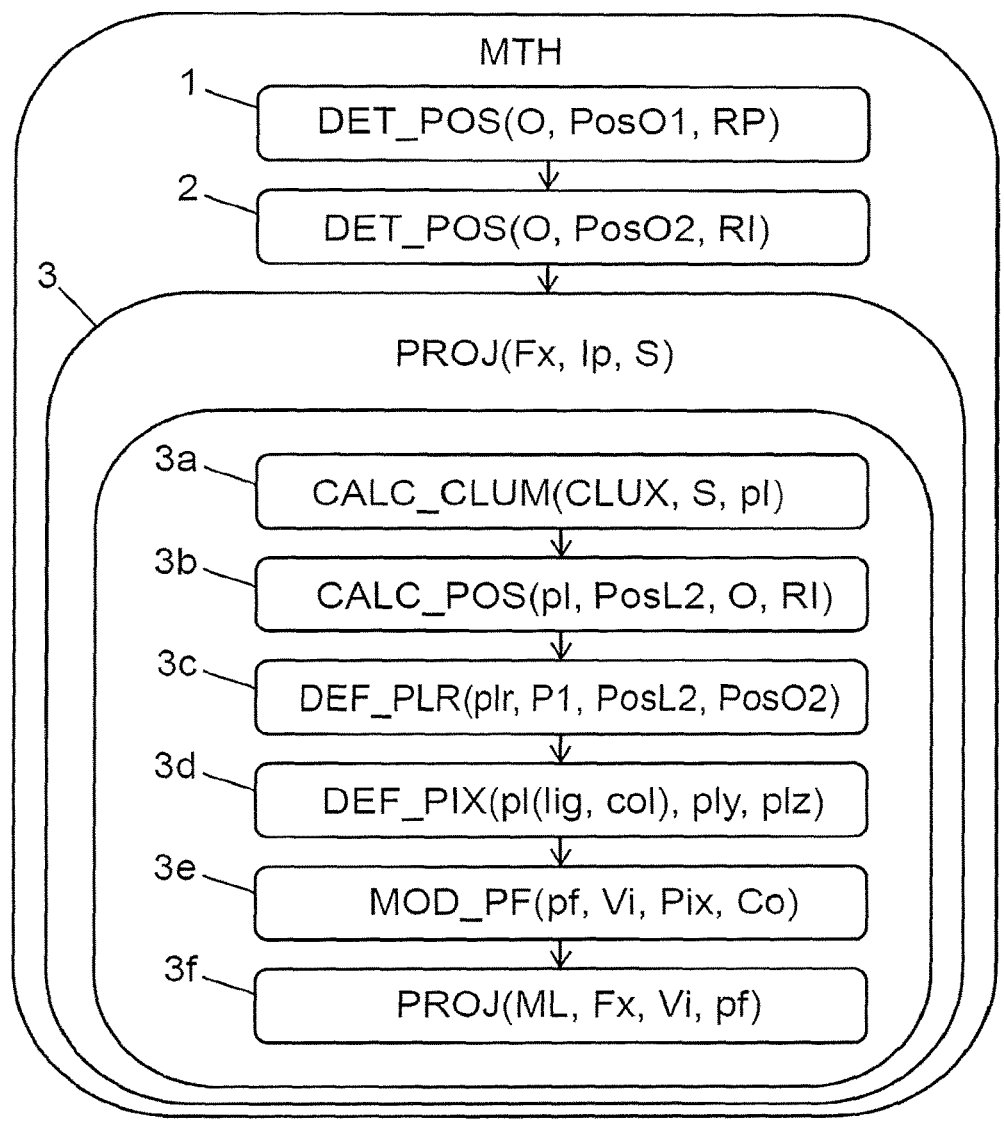
FIG. 9 shows a logical diagram of the steps of the method for projecting at least one image onto a projection surface according to a non-limiting embodiment of patent application number PCT/EP2016/071596.
Figure 16:
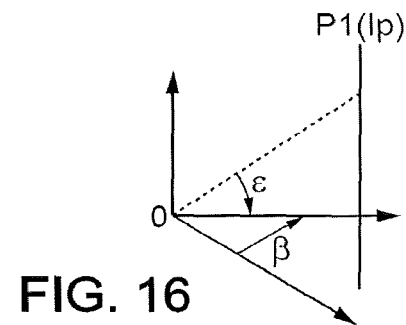
Figure 17:
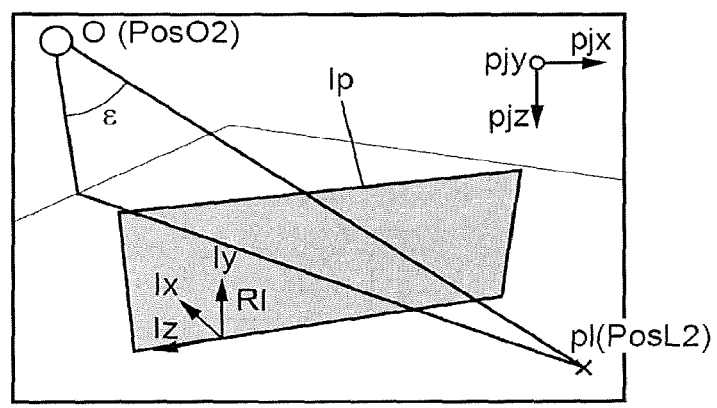
Figure 18:
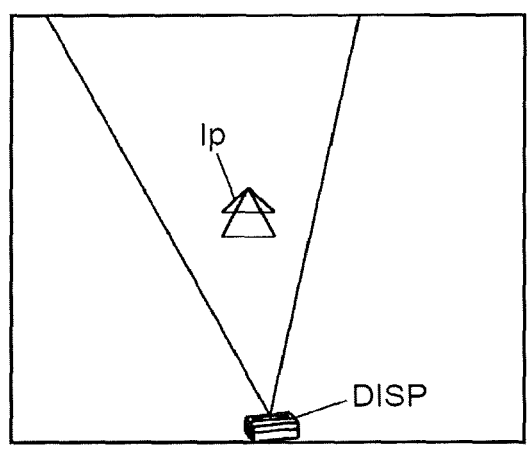
Figure 19:
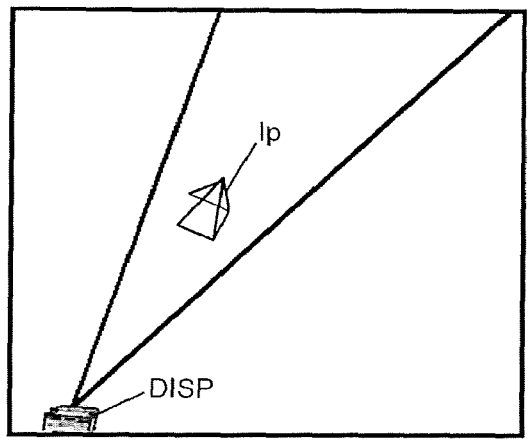
Figure 20:
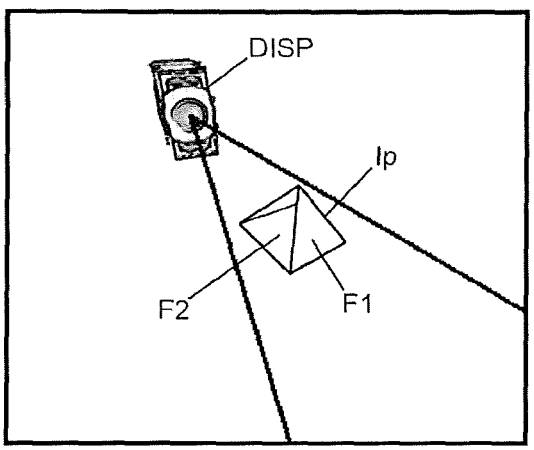
Figure 21:
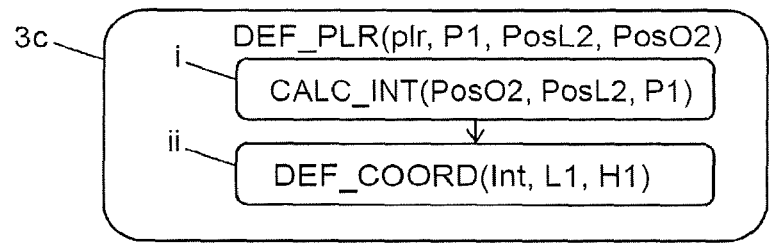
Figure 22:
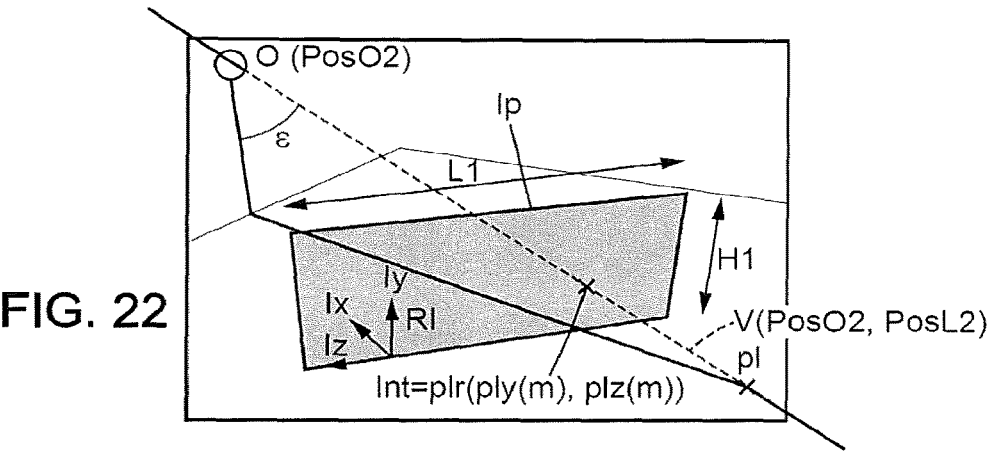
Figure 23:
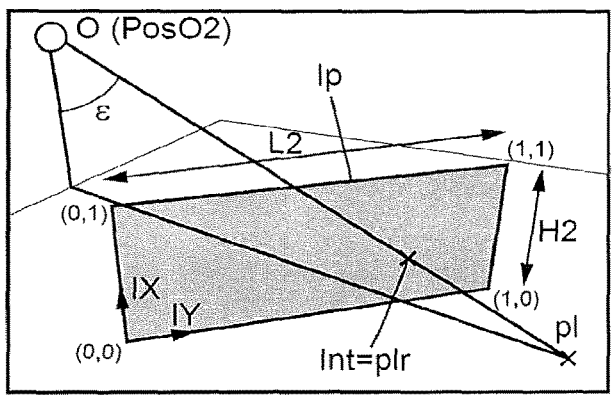
Figure 24:
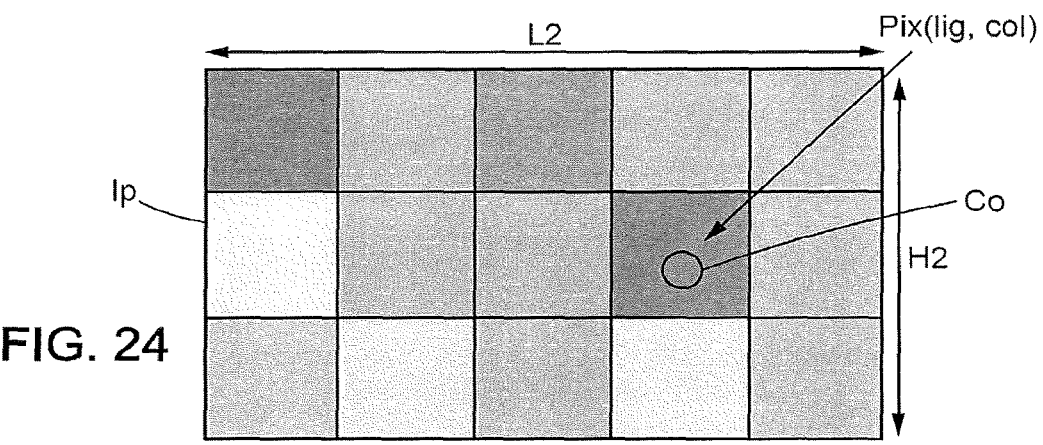
Figure 25:
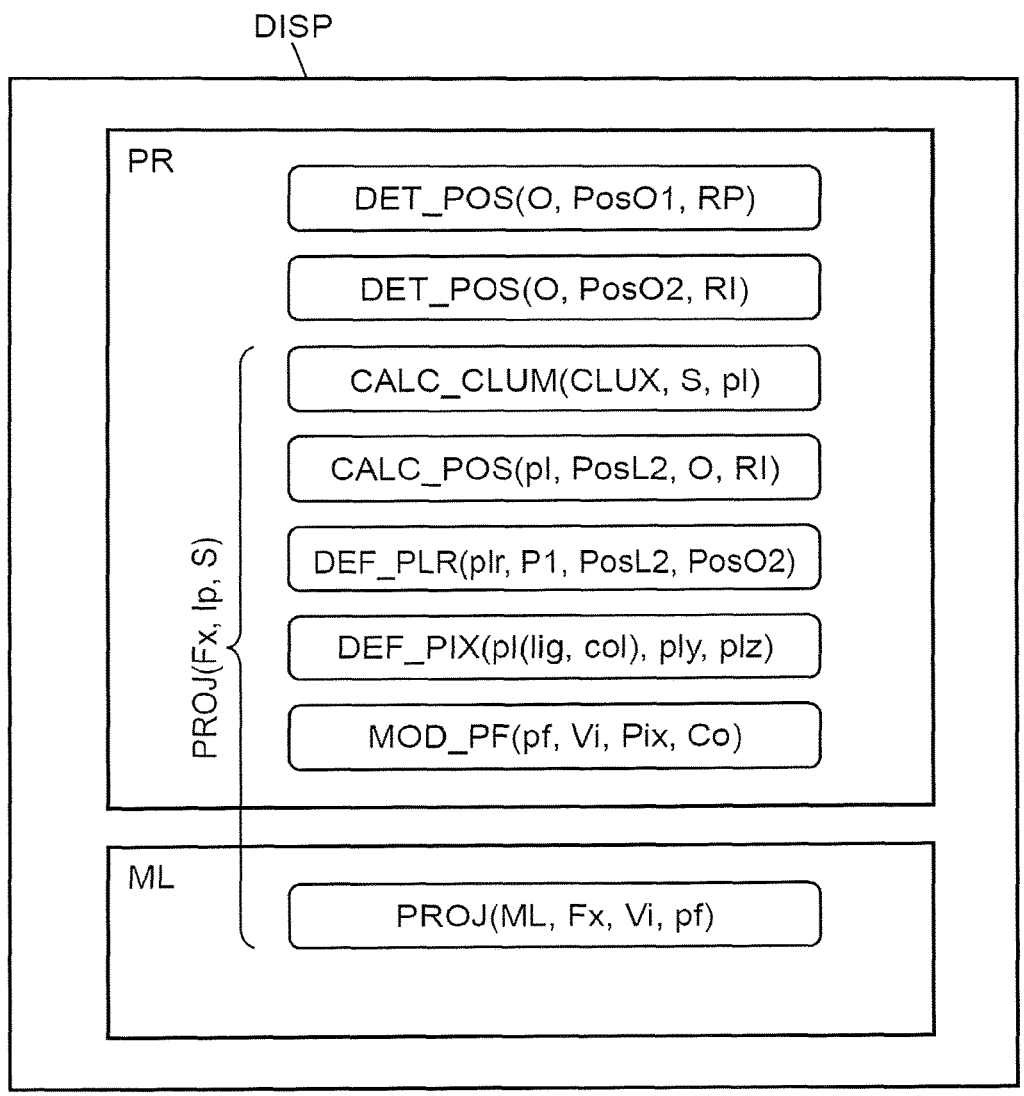

FIG. 16 indicates the elevation angle and the azimuth angle taken into consideration in a step of calculating the observation position of an observer in the projection method of FIG. 9;

FIG. 17 shows, schematically, a point of impact, an observation position of an observer outside the motor vehicle in an image reference frame and an image to be projected by the projection method of FIG. 9;

FIG. 18 shows an image projected according to the projection method of FIG. 9, viewed from the point of view of the driver of said motor vehicle but only comprehensible to an observer outside the motor vehicle;

FIG. 19 shows an image projected according to the projection method of FIG. 9, viewed from the point of view of a rear passenger of said motor vehicle but only comprehensible to an observer outside the motor vehicle;

FIG. 20 shows an image projected according to the projection method of FIG. 9, viewed from the point of view of said observer outside the motor vehicle and comprehensible to said observer outside the motor vehicle;

FIG. 21 shows a logical diagram illustrating sub-steps of a step for defining the coordinates of a projection of a luminance point of the projection method of FIG. 9 according to a non-limiting embodiment of patent application number PCT/EP2016/071596;

FIG. 22 shows, schematically, the point of impact, the observation position of the observer outside the motor vehicle and the image to be projected in FIG. 17 by the projection method of FIG. 9 and the coordinates of the intersection between the point of impact and the image to be projected;

FIG. 23 shows, schematically, the point of impact, the observation position of the observer outside the motor vehicle and the image to be projected in FIG. 22, normalized; and FIG. 24 shows, schematically, pixels of the image to be projected in FIG. 22; and FIG. 25 shows a lighting device designed to implement the projection method of FIG. 9.

DESCRIPTION OF EMBODIMENTS OF PATENT APPLICATION

Unless otherwise indicated, the elements that are identical, in structural or functional terms, and appear in different figures, have been given the same references.

The projection method MTH, for a motor vehicle, for projecting at least one image onto a projection surface by means of a light module ML according to patent application number PCT/EP2016/071596 is described in reference to FIGS. 9 to 25.

"Motor vehicle" should be understood to mean any motorized vehicle.

As shown in FIG. 9, the method MTH comprises the steps of:
- detecting an observation position PosO1 of an observer O in a light module reference frame RP (illustrated step DET_POS(O, PosO1, RP));
- calculating the observation position PosO2 of the observer O in an image reference frame RI (illustrated step DET_POS(O, PosO2, RI));
- projecting said image Ip onto said projection surface S depending on said observation position PosO2 of the observer O in said image reference frame RI, said image Ip being incorporated into said light beam Fx of the light module ML (illustrated step PROJ(Fx, Ip, S)).

As shown in FIG. 9, the projection of said image Ip comprises the sub-steps of:
- 3a) from a light intensity map CLUX of the light module ML comprising a plurality of intensity indicators pf, calculating a luminance map CLUM on the projection surface S resulting in luminance points pl (illustrated step CALC_CLUM(CLUX, S, pl));
- 3b) calculating the position PosL2 of each luminance point pl in the image reference frame RI (illustrated step CALC_POS(pl, PosL2, O, RI));
- 3c) from its position PosL2 and the observation position PosO2 of the observer O in said image reference frame RI, defining the coordinates ply, plz of the projection plr of each luminance point pl in the image plane P1 of said image to be projected Ip (illustrated step DEF_PLR(plr, P1, PosL2, PosO2));
- 3d) if said projection plr belongs to said image to be projected Ip, defining the coordinates lig, col of the corresponding pixel Pix (illustrated step DEF_PIX(pl (lig, col), ply, plz);
- 3e) for each projection plr of a luminance point pl belonging to said image to be projected Ip, correcting the intensity value Vi of the corresponding intensity indicator pf depending on the color Co of the corresponding pixel Pix (illustrated step MOD_PF(pf, Vi, Pix, Co)).

It should be noted that the first step 3a in particular, and step 3b in particular, can be carried out before the iterations of the subsequent steps. More generally, the described steps are not necessarily carried out in sequence, i.e. in a same iteration loop, but can be performed in different iterations, with different iteration frequencies.

The step of projecting the image Ip further comprises a sub-step 3f) of projecting the light beam Fx onto the projection surface S with the corrected intensity values Vi of the intensity indicators pf (illustrated step PROJ(ML, Fx, Vi, pf) in FIG. 9).

The projection method MTH is suitable for projecting one or more images Ip at the same time. Hereinafter in the description, the projection of a single image is used as a non-limiting example.

It should be noted that the projection can be to the front of the motor vehicle V, to the rear or to the sides.

The light module ML can be used to produce a light beam Fx, said light beam Fx comprising a plurality of light rays Rx oriented in different directions.

The light module ML can be used to modify the intensity value Vi of each intensity indicator pf, and is therefore a digital light module. As described below, the image to be projected Ip is thus incorporated into the light beam Fx of the light module ML.

It should be noted that the light intensity map CLUX is discretized so as to make it usable digitally.

The light module ML is considered to be a point light source based on which the space around said light source is discretized. Thus, an intensity indicator pf is a point of the space illuminated by the light module ML that comprises a certain direction dir1 and a given intensity value Vi provided by the light module ML in said direction dir1. The direction dir1 is given by two angles $\theta$ and $\delta$ (described below).

In a non-limiting embodiment, the projection surface S is the ground (reference S1) or a wall (reference S2). The image that is projected Ip onto the ground or the wall is therefore a 2D image.

Figure 10:
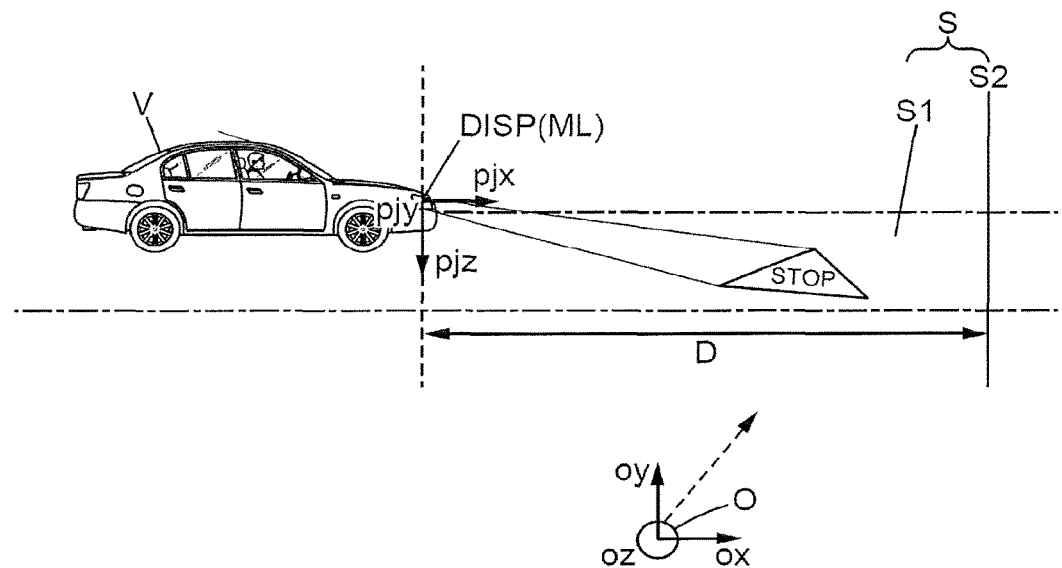
FIG. 10 shows a motor vehicle comprising a lighting device designed to implement the projection method of FIG. 9 according to a non-limiting embodiment of patent application number PCT/EP2016/071596.

In a non-limiting embodiment shown in FIG. 10, a lighting device DISP of the motor vehicle V comprises at least one light module ML and is suitable for implementing the projection method MTH. In the non-limiting example shown, the lighting device is a headlamp.

As described below, the observation position of the observer O is taken into account for the projection of the image to be projected Ip. To this end, the image to be projected Ip is deformed in such a way as to be comprehensible to the observer in question, whether this is the driver or a front or rear passenger of the motor vehicle, or an observer outside the motor vehicle.

It is thus helpful to assume the point of view of the observer O for whom the projected image Ip is intended. From the point of view of the observer, the image Ip is not deformed. From a point of view different to that of said observer, the image Ip is deformed.

In non-limiting embodiments, an observer O outside the vehicle is a pedestrian, a driver of another motor vehicle, a cyclist, a motorcyclist, etc. He or she may be located in front, behind or to one side of the motor vehicle V.

In a non-limiting embodiment, the projected image Ip comprises at least one graphic symbol. This graphic symbol helps improve the comfort and/or safety of the observer O. In a non-limiting example, if the observer O is the driver of the motor vehicle, the graphic symbol can represent the speed limit not to be exceeded on the road, a graphic STOP symbol when the motor vehicle is reversing and an obstacle (pedestrian, wall, etc.) is located too close to the motor vehicle, or an arrow that helps when the motor vehicle is about to take a turn on a road, etc.

In a non-limiting example, in the case of an observer O outside the motor vehicle, such as a pedestrian or cyclist, the graphic symbol can be a STOP signal to instruct him or her not to cross in front of the motor vehicle, because it is about to move off again.

In a non-limiting example, in the case of an observer O outside the motor vehicle, such as a driver of a following motor vehicle, the graphic symbol can be a STOP signal if the motor vehicle in question brakes, to instruct the driver of the following vehicle to also brake. In another non-limiting example, if the observer O is outside the motor vehicle and is overtaking in another motor vehicle, the graphic symbol can be a warning symbol to advise the driver of said motor vehicle to pull back in because another motor vehicle is approaching in the opposite direction.

As shown in FIG. 10, the projected image is a STOP symbol. It is oriented on the projection surface S, which is the ground in the non-limiting example shown in this case, in such a way that the observer O can see and understand the STOP symbol. In the non-limiting example shown, the projection is forward of the motor vehicle V and the observer O is outside the motor vehicle V.

The different steps of the projection method MTH are described in detail below.

1) Detecting the Observation Position of the Observer in the Light Module Reference Frame RP In order to detect the observation position PosO1 of the observer O in the light module reference frame RP, it is necessary to detect the position of the observer O himself or herself in the light module reference frame RP. To this end, in a non-limiting example, a camera (not shown) is used. It is designed to detect and calculate the position of an observer O positioned outside the motor vehicle V.

In non-limiting embodiments, the camera is replaced with radar, or lidar.

In the case of an observer O located inside the motor vehicle (driver or passengers), reference observation positions are taken into consideration, for example. Therefore, in a non-limiting example, the driver's eyes are considered to be located in position PosO1 (1.5; −0.5; 1) (expressed in meters) with respect to the light module ML in the case of a motor vehicle that is a car. Naturally, if the motor vehicle is a truck, the position of the eyes relative to the light module ML is different.

For an outside observer, the observation position PosO1 of said observer O, which corresponds to the position of his or her eyes, can be deduced from his or her position. For example, the position of his or her eyes is located approximately 1.5 meters above the ground.

Since detecting the position of the observer in this way is known to a person skilled in the art, it is not described in detail here.

2) Calculating the Observation Position of the Observer in the Image Reference Frame RI The observation position PosO1 of the observer O has previously been determined according to the light module reference frame RP. It is then used for the change of reference system described below.

This step involves a change of reference system. Indeed, it involves shifting from the light module reference frame RP (defined by the axes pjx, pjy, pjz) to the image reference frame RI (defined by the axes Ix, Iy, Iz) of the image to be projected Ip.

The calculation of the observation position PosO2 of the observer O in the image reference frame RI is based on at least one transformation matrix M for transforming the light module reference frame RP to said image reference frame RI.

In a non-limiting embodiment, the position PosO2 takes the following form:

$$\begin{bmatrix} pjx \\ pjy \\ pjz \\ 1 \end{bmatrix}$$

In a non-limiting embodiment, said at least one transformation matrix M takes into account at least one of the following parameters:

the position PosIp of the image to be projected Ip in the light module reference frame RP;

the rotation RotIp of the image to be projected Ip in the light module reference frame RP;

the scale of the image to be projected Ip.

The position PosIp of the image to be projected Ip is deduced from the light module reference frame RP according to a translational movement along the three axes pjx, pjy, pjz of said light module reference frame RP.

In a non-limiting embodiment, the transformation matrix M takes the following form:

$$\begin{bmatrix} a & b & c & t \\ d & e & f & u \\ g & h & i & v \\ 0 & 0 & 0 & 1 \end{bmatrix}$$

in which a, e and i are the affinity terms; b, c, d, f, g and h the rotation terms; and t, u and v the translational movement terms.

The affinity terms a, e and i allow the image Ip to be enlarged or shrunk; for example, the overall size (homothety) can be increased by 50% or reduced by 20%, by increasing the values of a, e and i by 50%, or reducing them by 20%.

For example, a value of a, e and i equal to 1 corresponds to a predefined reference dimension of the projected image, in directions pjx, pjy and pjz respectively. It is also possible to apply the enlargement or shrinkage factors in only one of the dimensions, or in two of the dimensions (non-homothetic). It is also possible to apply different enlargement or shrinkage factors to certain dimensions relative to others and, in particular, it is possible to apply different enlargement or shrinkage factors to each dimension. In this way, depending on the position PosO2 of the eyes of the observer O, the decision can be made to project an image in such a way that it appears, to the observer O, to be larger or smaller overall or in certain dimensions, depending on whether the values of a, e and i increase or decrease respectively.

It should be noted that the rotation RotIp depends on the following three angles:

β: azimuth angle (which indicates whether the image to be projected is located to the right or left of the observer, for example when the latter is looking to the right or left);

Ω: tilt angle (which indicates the inclination of the image to be projected Ip, for example when the observer is tilting his or her head to one side. This means leaning the image Ip over);

ε: elevation angle (which indicates the desired effect to be given to the graphic symbol of the image Ip).

FIG. 16 shows the elevation and azimuth angles and the plane P1 of the image to be projected Ip.

Thus, PosO2=M*PosO1.

PosO1 is the observation position of the observer O used for the projection of the image Ip in the light module reference frame RP.

PosO2 is the observation position of the observer O used for the projection of the image Ip in the image reference frame RI.

Thus, the position and rotation of the image to be projected Ip are adapted depending on the observer O. In this way, the image to be projected Ip will be comprehensible to the observer O. Therefore, an affine deformation of the image from the desired point of view is obtained, referred to as anamorphosis.

Thus, as seen by a driver of a car, the projected image Ip is not deformed. Similarly, the projected image Ip is also not deformed as seen by a driver of a truck, despite him or her being positioned well above the light module reference frame RP. Finally, the projected image is also not deformed from the point of view of an outside observer.

It should be noted that the projected image Ip can thus be visible to the observer because its projection depends on the observation position of the observer O and the scale of the image can be modulated as desired. Thus, even if he or she is far from the motor vehicle, the observer O will still be able to understand and see the graphic symbol(s) of the projected image.

3) Projecting the Image Ip onto the Projection Surface

This step comprises the following sub-steps:

3a) Calculating a Luminance Map CLUM

In a non-limiting embodiment, the light intensity map CLUX is stored in a memory. It will have already been established during the design of the product, by means of a goniophotometer (not shown). The goniophotometer can, for example, be a type A goniophotometer, i.e. the rotational movement about the horizontal axis supports the rotational movement about the vertical axis adjusted by the rotation about the horizontal axis. The light intensity map CLUX gives the intensity indicators pf of the light module ML considered as a point light source. The direction dir1 of a light ray Rx leaving the light module ML is expressed according to two angles $\theta$ and $\delta$ and is given by the following formula:

$$\text{direction} = \begin{pmatrix} \cos\theta * \cos\delta \\ \sin\theta \\ \cos\theta * \sin\delta \end{pmatrix}$$

in which $\delta$ is the vertical rotation V of the goniophotometer; and $\theta$ is the horizontal rotation H of the goniophotometer.

Figure 11:
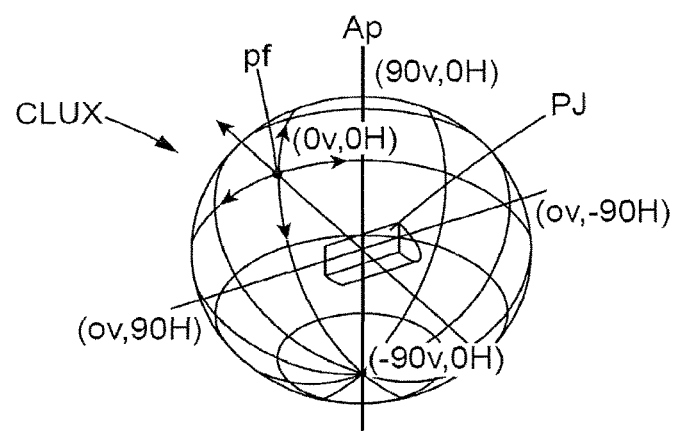
FIG. 11 shows a light intensity map established according to a step of the projection method of FIG. 9 according to a non-limiting embodiment of patent application number PCT/EP2016/071596.

The light intensity map CLUX thus comprises a plurality of intensity indicators pf, the direction dir1 of which is given by the above formula, in which $\theta$ is the horizontal angle of the intensity indicator pf, and $\delta$ is the vertical angle of the intensity indicator pf. The light intensity map CLUX is shown in FIG. 11. In it, an intensity indicator pf with polar coordinates $\delta=0V$, $\theta=0H$ can be seen. The light intensity map CLUX can thus be used to determine an intensity $I(\theta,\delta)$ for a given direction.

Therefore:

$CLUX=\{(\delta_i, \theta_j, I_{i,j}), (i, j) \in [1,M] \times [1,N]\}$, in which M and N are the numbers of discretization points (or intensity indicators) of the light beam Fx in the vertical and horizontal directions respectively.

An intensity indicator pf is therefore defined by its direction dir1 and its intensity $I(\theta,\delta)$.

Figure 12:
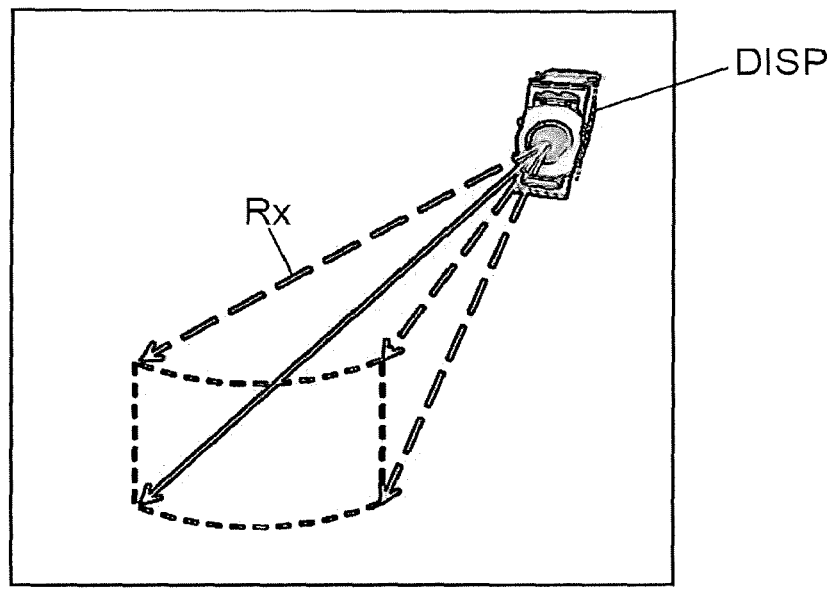
FIG. 12 shows a headlamp incorporating a light module and the direction of a light beam from a light module of said headlamp, said light module being designed to perform at least one step of the projection method of FIG. 9.

FIG. 12 shows a lighting device DISP comprising a light module ML with the direction of a light ray Fx.

Figure 13:
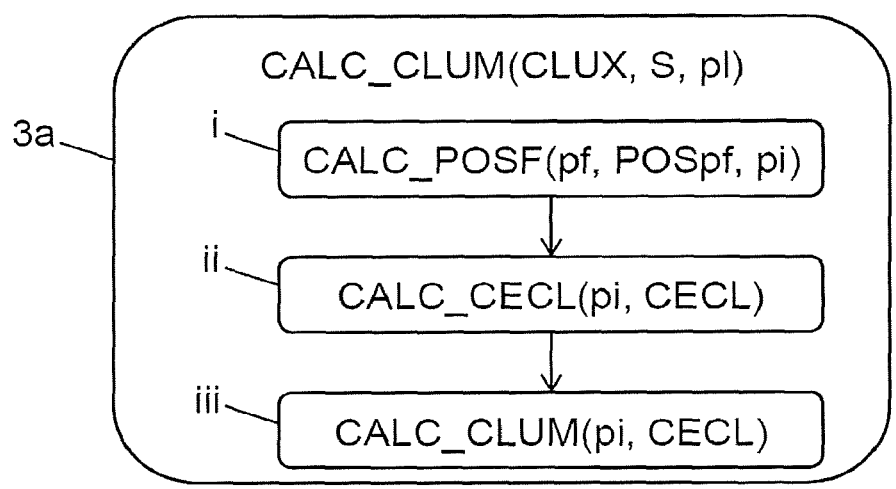
FIG. 13 shows a logical diagram illustrating sub-steps of a step for establishing a luminance map of the projection method of FIG. 9 according to a non-limiting embodiment.

The calculation of the luminance map GLUM on the projection surface S comprises the following sub-steps shown in FIG. 13.

i) a first calculation of the position POSpf of said intensity indicators pf on the projection surface S resulting in points of impact pi (illustrated step CALC_POSF(pf, POSpf, pi));

ii) a second calculation of an illumination map CECL of said points of impact pi (illustrated step CALC_CECL (pi, CECL));

iii) a third calculation of the luminance map GLUM of said points of impact pi from the illumination map CECL resulting in said luminance points pl (illustrated step CALC_CLUM(pi, CECL)).

The different sub-steps are set out in detail below.

It should be noted that the calculations that follow are carried out as a function of the projection surface S (ground S1 or wall S2).

Sub-Step i)

The first calculation is based on:

the position POSpj of the light module ML in the Cartesian reference system x, y, z; and the direction dir1 of said previously described intensity indicators pf.

For the ground S1, the position POSpf1 of the intensity indicator pf on the ground in the Cartesian reference system x, y, z is thus obtained with the following formula.

$$POS_{pf}1 = POS_{pj} - (POS_{pj}.z/dir1.z)*dir1$$

In which POSpj.z is the z value of the position of the light module ML (height of the light module above the ground) and dir1.z is the z value of the direction vector of the light ray Rx.

For the wall S2, the position POSpf2 of the intensity indicator pf on the wall in the Cartesian reference system x, y, z is thus obtained with the following formula.

$$POS_{pf}2 = POS_{pj} - (D/dir1.x)*dir1.$$

In which dir1.x is the x value of the direction vector of the light ray Rx;

D is the distance between the light module ML and the wall. In a non-limiting example, D is equal to 25 meters.

Figure 14:
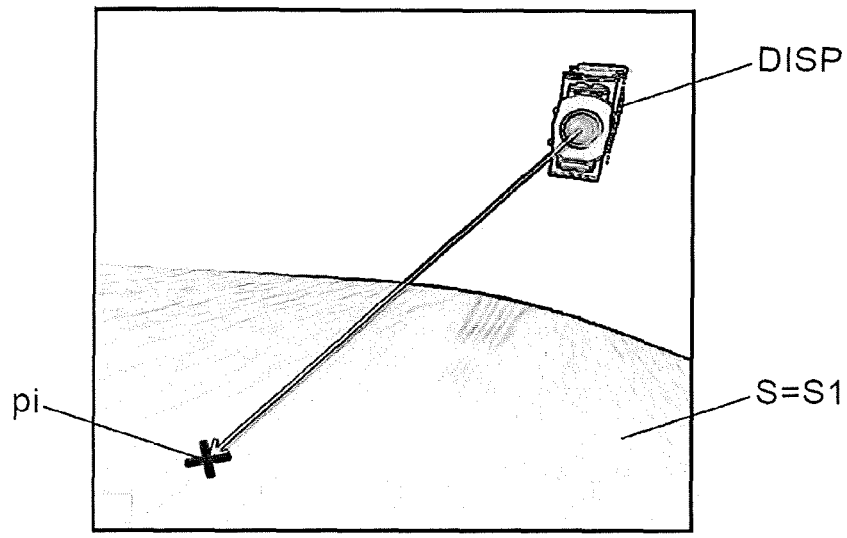
FIG. 14 shows the headlamp of FIG. 12 and a point of impact of the light ray on the ground.

In this way, a point of impact pi (in position POSpf1 or POSpf2) is obtained on the ground S1 or on the wall S2. FIG. 14 shows a non-limiting example of the point of impact pi on a projection surface S that is the ground S1.

Sub-Step ii)

Once the point of impact pi on the ground S1 or on the wall S2 has been determined, the illumination E of this point of impact pi is calculated from the intensity $I(\theta,\delta)$ of the previously determined intensity indicator pf.

Therefore, for the ground S1, the illumination $E_R$ of the point of impact pi on the ground is obtained with the following formula.

$$E_R = -(I(\theta,\delta)/dist1^2)*\cos\theta*\sin\delta$$

In which dist1 is the distance between the point of impact pi and the light module ML.

Therefore, for the wall S2, the illumination $E_M$ of the point of impact pi on the wall is obtained with the following formula.

$$E_M = (I(\theta,\delta)/dist1^2)*\cos\theta*\cos\delta$$

In which dist1 is the distance between the point of impact pi and the light module ML.

Figure 15:
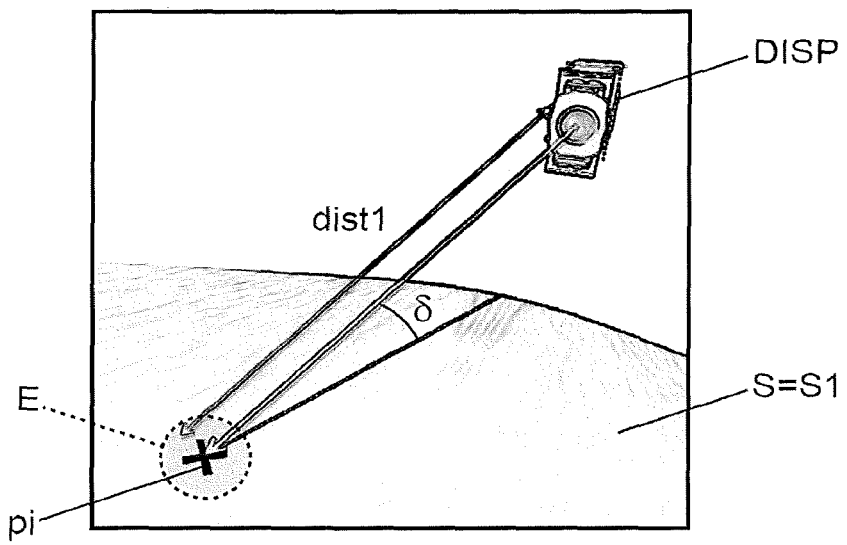
FIG. 15 shows the headlamp of FIG. 14 and the illumination of the point of impact.

FIG. 15 shows the illumination E (delimited by a dotted circle) of a point of impact pi on a projection surface S that is the ground S1.

Sub-Step iii)

The third calculation is based on:

the illumination E of said points of impact pi;

a position vector Roeil/Moeil between the position of a point of impact pi of the illumination map CECL and the observation position PosO1 of the observer O (in the light module reference frame RP); and a light diffusion function d.

d is a known function that can be used to calculate the diffusion of light by the projection surface S. It should be noted that it varies depending on the nature of the projection surface S. For example, the function d is different if the surface is asphalt, concrete, tar, cobblestones, etc.

Therefore, for the ground S1, the luminance $L_R$ of the point of impact pi on the ground is obtained with the following formula.

$$L_R = E_R \frac{d\left(\arccos\left(\frac{R_{oeil}}{\|R_{oeil}\|} \cdot z\right)\right)}{\frac{R_{oeil}}{\|R_{oeil}\|} \cdot z}$$

In which $$\frac{Roeil}{\|Roeil\|} \cdot z$$

is the z value of the normalized vector Roeil.

Therefore, for the wall S2, the illumination $L_M$ of the point of impact pi on the wall is obtained with the following formula.

$$L_M = E_M \frac{d\left(\arccos\left(\frac{M_{oeil}}{\|M_{oeil}\|} \cdot x\right)\right)}{\frac{M_{oeil}}{\|M_{oeil}\|} \cdot x}$$

In which $$\frac{Moeil}{\|Moeil\|} \cdot x$$

is the x value of the normalized vector Roeil.

In a non-limiting embodiment, it is assumed that the projection surface S emits in a uniform manner in all directions. In this case, the diffusion parameter d does not depend on the angles δ and θ.

In a non-limiting embodiment, Ia projection surface S is considered to be a Lambertian diffuser (for example a grey body). This results in constant luminance on the projection surface S proportional to illumination E and, in this case, the diffusion function d is a cosine.

In this case, $L_R = a/\pi\, E_R$ because $$L_R = E_R \frac{\frac{a}{\pi} \cdot \cos\left(\mathrm{acos}\frac{\vec{R}_{oeil} \cdot \vec{z}}{\|\vec{R}_{oeil}\|}\right)}{\frac{\vec{R}_{oeil} \cdot \vec{z}}{\|\vec{R}_{oeil}\|}} = \frac{a}{\pi} E_R$$

in which a is the albedo of the material.

and $L_M = a/\pi\, E_M$

In non-limiting examples, the albedo of asphalt is 7%, and that of concrete ranges from 17% to 27%.

3b) Calculating the Positions of the Luminance Points pl in the Image Reference Frame RI The position PosL1 of a luminance point pl has previously been determined according to the light module reference frame RP. It is then used for the change of reference system described below.

As when calculating the observation position PosO2 of the observer O, this step involves a change of reference system. Indeed, it involves shifting from the light module reference frame RP (defined by the axes pjx, pjy, pjz) to the image reference frame RI (defined by the axes Ix, Iy, Iz) of the image to be projected Ip.

The calculation of the position PosL2 of a luminance point pl in the image reference frame RI is based on said at least one transformation matrix M for transforming the light module reference frame RP to said image reference frame RI (the transformation matrix M described previously).

In a non-limiting embodiment, the position PosL2 is of the same form as the position PosO2 described previously:

$$\begin{bmatrix} pjx \\ pjy \\ pjz \\ 1 \end{bmatrix}$$

It should be noted that the transformation matrix M was described in the section concerning the calculation of the observation position PosO2 of the observer O in the image reference frame RI. It will therefore not be detailed again here.

Thus, PosL2=M*PosL1.

PosL1 is the position of the luminance point pl in the light module reference frame RP.

PosL2 is the position of the luminance point pl in the image reference frame RI.

FIG. 17 shows the image to be projected Ip and the image reference frame RI. Also shown are the luminance point pl and the position of the observer's O eyes (which corresponds to the observation position) with their respective positions PosL2 and PosO2 defined in the image reference frame RI.

It should be noted that, although the image Ip projected on the ground or on the wall is in 2D, (two dimensions), it is possible to obtain a 3D effect (three dimensions), i.e. a perspective or trompe l'œil effect, by adjusting the elevation angle ε seen previously. The observer O (whether this is the driver, a passenger or an outside observer) will then see the image in perspective. To this end, the elevation angle ε is greater than −90°.

In particular, it is greater than −90° and less than or equal to 0°. The 3D effect can thus be seen between 0 and −90° (not inclusive).

It should be noted that, at −90°, the image IP is flat on the ground and therefore does not have a 3D effect.

FIGS. 18 to 20 show a projected image Ip that is a pyramid. An observer O who is outside the motor vehicle, such as a pedestrian, is taken as a non-limiting example. The pyramid can be seen from three specific points of view: the point of view of the driver (FIG. 18), the point of view of a rear passenger (FIG. 19) and the point of view of the pedestrian (FIG. 20), but is only seen with a 3D effect from a single point of view. In the non-limiting example shown, only the pedestrian sees the pyramid in 3D (as shown in FIG.

20). From the point of view of the driver or passenger, the pyramid appears to be deformed.

In a non-limiting embodiment, the elevation angle ε is equal to 0. The observer O is looking straight ahead. In this case, the observer O will see the image, i.e. in this case the pyramid, as though it were upright.

In a non-limiting embodiment, the elevation angles is substantially equal to −35°. This makes it possible to produce a raised 3D effect in the direction of the road.

The plane P1 of the image Ip is thus perpendicular to the direction of observation of the observer O.

If the elevation angle ε is different to −90°, the pyramid will thus appear in 3D but will be tilted to a greater or lesser extent.

3c) Defining the Coordinates ply, plz of the Protection plr of a Luminance Point pl As shown in FIG. 21, in a non-limiting embodiment, defining the coordinates ply, plz of the projection plr of a luminance point pl comprises the sub-steps of:
  i) calculating the point of intersection Int between (illustrated sub-step CALC_INT(PosO2, PosL2, P1)):
    the straight line V(PosO2, PosL2) passing through the observation position PosO2 in said image reference frame RI of the observer O and through the position PosL2 in said image reference frame RI of said luminance point pl; and
    the image plane P1 of the image to be projected Ip.
  ii) determining the coordinates ply, plz of said point of intersection Int from the dimensions L1, H1 of said image to be projected Ip (illustrated sub-step DEF_COORD(Int, L1, H1).

These two sub-steps are described below.

Sub-Step i)

In the image reference frame RI, the point of intersection Int between the straight line (eye position, luminance point) and the image plane P1 is the point on the straight line (eye position, luminance point) where Ix=0. Therefore:

$$Int=PosO2-((PosO2.x)/(V(PosO2,PosL2).x))*V(PosO2,PosL2)$$

In which
V(PosO2, posL2) is the vector representing the straight line (eye position, luminance point) in the image reference frame RI;
V(PosO2, posL2).x is the x value of the vector;
Int is the point of intersection between the straight line (eye position, pl) and the image to be projected Ip in the image reference frame RI. The point of intersection Int is thus the projection plr of the luminance point pl on the image plane P1 of the image to be projected Ip;
PosL2.x is the x value of the position of the luminance point pl;
PosO2.x is the x value of the observation position of the observer.

It should be noted that it is assumed that the observation position of the observer O is positioned on the axis Ix.

FIG. 22 shows the image to be projected Ip, the point of intersection Int that corresponds to the projection plr of the luminance point pl on said plane P1 and the vector V(posO2, posL2) (shown as a dotted line). It should be noted that the projection plr is a central projection, so as to produce a conical perspective effect. Hereinafter, no distinction will be made between the terms projection plr or central projection plr.

Sub-Step ii)

The coordinates ply, plz of the central projection plr of the luminance point pl in the image reference frame RI correspond to the coordinates along the axis Iy (vertical) and the axis Iz (horizontal) of the position of the previously determined point of intersection Int. In a non-limiting embodiment, they are expressed in meters.

The coordinates of this point in the reference system of FIG. 22 are deduced using the following formulae:

$$ply=(Int.y+(L1/2))/L1$$

$$plz=Int.z/H1$$

In which,
L1 is the width of the image to be projected Ip (expressed in meters in a non-limiting example);
H1 is the height of the image to be projected Ip (expressed in meters in a non-limiting example);
Int.y is the y value of the point of intersection;
Int.z is the z value of the point of intersection.

FIG. 22 shows the definition of the coordinates ply and plz in meters in the image reference frame RI.

It should be noted that L1 and H1 are input parameters of the projection method MTH.

This sub-step makes it possible to subsequently determine whether the coordinates ply, plz belong to the image to be projected Ip (in which case they need to be between 0 and 1) and, therefore, whether the central projection plr of the luminance point pl belongs to the image to be projected Ip.

To this end, in a non-limiting embodiment, the image to be projected Ip and the coordinates of the projection plr thus calculated are normalized. This helps simplify the test of belonging to the image to be projected Ip.

In this way, a normalized reference system IX (vertical axis), IY (horizontal axis) is obtained, as shown in FIG. 23. The value of the coordinates ply, plz of the projection plr is now between 0 and 1. In the example shown, the axes Iy and Iz have become the axes IX and IY respectively. In this way, image dimensions H2, L2 of between 0 and 1 are obtained.

FIG. 23 shows the definition of the coordinates ply and plz in values without units in the image reference frame RI.

It should be noted that the size (L1, H1) of the image to be projected Ip can be defined in this step 3c) or in the step with the transformation matrix M.

Since the dimensions L1, H1 and therefore L2, H2, the position and rotation of the image to be projected Ip are known (these are input parameters of the projection method MTH), it is easy to determine, via its coordinates ply, plz, whether or not the projection pl belongs to the image to be projected Ip.

3d) Defining the Coordinates of the Corresponding Pixel Pix

The row (lig) and column (col) coordinates of the pixel Pix are defined for each projection plr (of luminance point pl) that belongs to the image to be projected Ip, i.e. that is located inside the rectangle L2*H2 of the image to be projected Ip, which has been verified in step 3c-ii).

Thus, if the projection plr belongs to the image to be projected Ip, the coordinates of the corresponding pixel Pix are calculated. They are calculated as follows.

$$Lig=-plz*L2$$

$$Col=ply*H2$$

In which,
lig is the row of the pixel;
col is the column of the pixel;
L2 is the width of the image to be projected Ip (this time expressed in pixels);

H2 is the height of the image to be projected Ip (this time expressed in pixels);

ply is the coordinate of the projection plr on the axis IX;

plz is the coordinate of the projection plr on the axis IY.

3e) Correcting the Intensity Value of the Corresponding Intensity Indicator pf

With the coordinates lig, col of the pixel Pix, the value of its color Co can be recovered in the image that is to be projected.

In a non-limiting example, the value is between 0 and 255, ranging from white to black and including several shades of grey in between, as shown in FIG. 24. The term "white" should be taken to mean any unique color and the expression "shades of grey" should be taken to mean the shades of said unique color obtained between its lightest shade and black. Therefore, the projected image does not necessarily consist of the color white and the shades of grey associated with the values of Co of between 0 and 255, but of the darker or lighter shades of any color visible to the human eye. Advantageously, the color is white, yellow, blue, red or amber.

The intensity value Vi of the corresponding intensity indicator pf is then corrected.

It should be noted that this is possible because the light module ML is a digital light module.

In a first non-limiting embodiment, the correction is made as follows:

$$Vi = \sigma \cdot Vi0 * Co/255.$$

In which:

Vi0 is the initial intensity value of the intensity indicator pf of the light module, Co is the color of the corresponding pixel Pix; and σ is a maximum over-intensification factor.

In a second non-limiting embodiment, the correction is made as follows:

Vi=φ·Co, in which φ is a luminance coefficient. In this way, the luminances are substituted. This makes it possible to display the image on a background independent of the base light distribution.

This step is carried out for all the luminance points pl of which the central projection plr belongs to the rectangle L2*H2 of the image to be projected Ip.

Thus, the light module ML can project, onto the projection surface S, the light beam Fx comprising the light rays Rx with the corrected intensity values Vi of the intensity indicators (step 3f) shown in FIG. 9 PROJ(ML, Fx, pf, Vi). This makes it possible to display the correct color Co for the intensity indicator in question. In this way, the image to be projected Ip is incorporated into the light beam Fx of the light module ML (since it is produced by said light module ML itself) and is projected onto the projection surface S in the correct colors.

Thus, depending on the desired color Co of a pixel Pix, a determined correction factor is applied to the intensity value Vi of the corresponding intensity indicator pf. In this way, it is possible to obtain intensity indicators whose color does not depend on the light intensity of the light beam Fx itself. For example, the projected pyramid shown is uniform in color.

If a light source independent of the light module ML was projecting said pyramid in a superimposed manner onto said light beam, this would not be the case. The pixels of the image would be illuminated to a greater or lesser extent depending on the distribution of light intensity of said light beam. Their color would thus vary depending on the light intensity of said light beam.

Moreover, the fact that the image to be projected Ip is incorporated into said light beam Fx and not superimposed onto it helps improve the contrast of the image on the projection surface S, compared to the result when an independent light source is used. In the case of an independent light source, the light beam also illuminates the projected image. The colors of the latter are therefore lighter.

It should be noted that the color value Co of a pixel, or of a series of pixels corresponding to predetermined portions of the projected image, can also be used to enhance the 3D effect. For example, in reference to FIG. 12, the pixels corresponding to the face F1 of the pattern of the projected image and those corresponding to the face F2 of the pattern of the projected image, can comprise specific and different color values Co. Thus, the face F1 appears to be brighter than the face F2, or vice versa, depending on whether the value of the color Co corresponding to the pixels that form the face F1 is greater than or less than that which corresponds to the pixels forming the face F2. The value of the color Co corresponding to the pixels forming the face F1 and/or F2 can also vary in such a way as to produce a gradient effect, for example from one side to the other of the face F1 and/or F2, helping further enhance the 3D effect.

It is possible to obtain multi-colored images by using several systems functioning according to the abovementioned method and each emitting a visually different color. The images projected by each system are then calculated to be projected onto the projection surface S in a superimposed manner, so as to obtain a multicolor overall projected image.

It should be noted that, since the projection of the image to be projected Ip depends on the observation position of the observer O, it is therefore updated continuously depending on the movement of the observer O relative to the motor vehicle when the observer is outside the motor vehicle, and depending on the movement of the motor vehicle itself when the observer O is inside the motor vehicle. In a non-limiting embodiment, the frequency with which the calculations set out above are refreshed thus depends on the speed of movement of the observer relative to the motor vehicle, in the case of an outside observer. The higher the speed, the higher the refresh frequency. The lower the speed, the lower the refresh frequency.

In another non-limiting embodiment, the frequency with which the calculations set out above are refreshed is constant. In a non-limiting example, the frequency is one second.

Therefore, since these calculations are carried out in real time, it is not necessary to have a database with images of a same graphic symbol pre-loaded in the memory corresponding to several imaginable observation positions of the observer relative to the motor vehicle (in the case of an outside observer), or in the motor vehicle (when he or she is inside).

The projection method MTH thus makes it possible to project one or more images Ip onto a projection surface S in such a way as to be not only visible to an observer located inside or outside the motor vehicle, but also comprehensible to him or her, because the projected image is oriented in the direction in which said observer O is looking.

It should be noted that, in the case in which several images Ip are projected at the same time, the combination of different images with the light beam Fx is calculated before projecting the overall result.

In a non-limiting embodiment, the projection method MTH is implemented by a lighting device DISP for a motor vehicle V.

In a non-limiting embodiment, the lighting device DISP can be used to perform a photometric function such as a low beam or a high beam, or a front, rear and/or side indicator function. Thus, the lighting device is located at the front of the motor vehicle or at the rear.

The lighting device DISP is shown in FIG. 25. It comprises a processing unit PR and at least one light module ML. In non-limiting embodiments, the lighting device is a headlamp or a tail light.

The processing unit PR is suitable for:
- detecting an observation position PosO1 of an observer O in a light module reference frame RP (illustrated function DET_POS(O, PosO1, RP));
- calculating the observation position PosO2 of the eyes of the observer O in an image reference frame RI (illustrated function DET_POS(O, PosO2, RI));

Said lighting device DISP is capable of projecting said image Ip onto said projection surface S depending on said observation position PosO2 of the observer O in the image reference frame RI, said image Ip being incorporated into said light beam Fx of the light module ML (illustrated function PROJ(Fx, Ip, S)).

For the projection of said image Ip onto said projection surface S, the processing unit PR is further suitable for:
- from a light intensity map CLUX of the light module ML comprising a plurality of intensity indicators pf, calculating a luminance map CLUM on the projection surface S resulting in luminance points pl (illustrated function CALC_CLUM(CLUX, S, pl));
- calculating the position PosL2 of each luminance point pl in the image reference frame RI (illustrated function CALC_POS(pl, PosL2, O, RI));
- from its position PosL2 and the observation position PosO2 of the observer O in said image reference frame RI, defining the coordinates ply, plz of the projection plr of each luminance point pl in the image plane P1 of said image to be projected Ip (illustrated function DEF_PLR(plr, P1, PosL2, PosO2));
- if said projection plr belongs to said image to be projected Ip, defining the coordinates lig, col of the corresponding pixel Pix (illustrated function DEF_PIX(pl(lig, col), ply, plz);
- for each projection plr of a luminance point pl belonging to said image to be projected Ip, correcting the intensity value Vi of the corresponding intensity indicator pf depending on the color Co of the corresponding pixel Pix (illustrated function MOD_PF(pf, Vi, Pix, Co)).

For the projection of said image Ip onto the projection surface S, the light module M is capable of projecting the light beam Fx onto the projection surface S with the corrected intensity values VI of the intensity indicators pf (illustrated function PROJ(ML, Fx, Vi, pf)).

It should be noted that the processing unit PR is incorporated into the light module ML or is independent of said light module ML.

Naturally, the description of patent application PCT/EP2016/071596 is not limited to the embodiments described above.

Thus, in another non-limiting embodiment, a type B goniophotometer can also be used, i.e. the rotational movement about the vertical axis supports the rotational movement about the horizontal axis.

Thus, in another non-limiting embodiment, the processing unit PR can be offset from the lighting device DISP.

Thus, the step of calculating the observation position PosO2 in the image reference frame RI can be carried out before or at the same time as the calculation of the luminance position PosL2.

Thus, the motor vehicle V comprises one or more lighting devices DISP suitable for implementing the described projection method MTH.

Thus, the described patent application PCT/EP2016/071596 has, in particular, the following advantages:
- it makes it possible to project an image comprising at least one graphic symbol that helps improve the comfort and/or the safety of an observer who is inside or outside the motor vehicle;
- it makes it possible to project an image that is visible and comprehensible to a determined observer because said projection depends on the position of said observer; thus, the same projection method is applied to project an image comprehensible to the driver or to project an image comprehensible to a pedestrian or indeed to a driver in a following vehicle, for example; it allows the image to be projected Ip to be deformed in such a way as to be comprehensible to a determined observer. Therefore, an anamorphosis of an image is created, said anamorphosis depending on the observation position of the observer O;
- the observation position of the observer in the image reference frame depends on the position and rotation of said image to be projected. As a result of the rotation, which depends particularly on an elevation angle, when the latter is adjusted in a particular manner, the observer has the impression of viewing a 3D image;
- it makes it possible to incorporate the information to be projected into the light beam Fx of the light module ML of the motor vehicle. It is not necessary to have a dedicated additional light source;
- thus, contrary to a prior art document that displays an image directly on the window of the tail light of the motor vehicle and that can appear too small at a certain distance, the invention does allow an outside observer located at a certain distance from said motor vehicle to see the image, because it is projected according to the position of the observer himself or herself and onto a projection surface that is not the window of a light of the motor vehicle. The dimensions of the image to be projected Ip are no longer limited to a small projection surface such as the window of the light;
- it makes it possible to propose a solution that can be used for a recipient of the information who can only see the front or sides of the motor vehicle, for example, unlike a solution that displays an image on the tail lights of the motor vehicle;
- it makes it possible to propose a solution other than the displaying of an image or images on the tail lights of the motor vehicle;
- it makes it possible to propose a solution other than the displaying of an image or images dedicated only to the driver of the motor vehicle.

The invention claimed is:

1. Method for projecting at least one image, by a projection system of a motor vehicle comprising a device for detecting an event, an estimation device capable of estimating the time taken to reach said event, a processing unit capable of generating a control signal, a projection device capable of receiving the control signal and projecting digital images, and a storage unit storing at least one image representative of a pictogram, wherein said projection method comprises the following steps:

a) detecting an event, b) estimating the time taken to reach the event, c) selecting at least one image representing a pictogram characteristic of the detected event, and d) establishing a sequence of images representing an animation of said pictogram, said sequence of images being paced depending on the time estimated in estimation step b);

e) projecting said sequence of images onto the roadway.

2. Projection method according to claim 1, the projection system further comprising an imager intended to image a driver of the motor vehicle, and in which the projection method further comprises the following steps:

determining the position of the driver in a predefined reference frame referred to as the projection reference frame, calculating a transformation matrix (M) depending on the determined position of the driver, and in which said sequence of images is established from said at least one selected image, said transformation matrix (M) and at least one predefined parameter ($\varepsilon$).

3. Projection method according to claim 2, wherein said animation comprises at least the pivoting of the pictogram relative to a horizontal axis (A-A) perpendicular to the direction of travel of the vehicle.

4. Projection method according to claim 2, wherein the projection method comprises a step of adding at least one area of shadow to said at least one selected image such that the pictogram is perceived in 3D by said driver.

5. Projection method according to claim 1, wherein said animation shows the pictogram increasing in size.

6. Projection method according to claim 1, wherein said animation shows a displacement movement of the pictogram.

7. Projection method according to claim 1, wherein said animation comprises an over-intensification or under-intensification of at least a portion of an image of the sequence of images.

8. Projection method according to claim 1, wherein the event is an event chosen from an approaching junction, dangerous bend, speed bump and motorway exit.

9. Projection method according to claim 1, wherein the detection device is a geographical location device of the vehicle in which the event is an indication of the path to be followed in order to complete a route selected by the driver.

10. Projection method according to claim 2, that further comprises a step of capturing an image of the driver of the motor vehicle, and wherein the step of determining the position of the driver in a predefined reference frame referred to as the projection reference frame (Rp) is implemented from the captured image.

11. System for projecting at least one image, for a motor vehicle, said projection system comprising:

a device for detecting an event, a device for estimating the time taken to reach the event, a storage unit suitable for storing at least one image representing a pictogram characteristic of an event, a processing unit capable of selecting, from the storage unit, at least one image representing a pictogram characteristic of the detected event, the processing unit being designed to establish a sequence of images representing an animation of said pictogram, said sequence of images being paced depending on the time estimated by the estimation device; and a projection device capable of projecting said sequence of images onto the roadway.

12. Projection system according to claim 11, wherein the processing unit is capable of determining the position of the driver in a predefined reference frame referred to as the projection reference frame (Rp) from the at least one captured image, the processing unit being capable of calculating a transformation matrix (M) depending on the determined position of the driver, the processing unit being capable of establishing said sequence of images from said at least one selected image, said transformation matrix and at least one predefined parameter.

13. Projection system according to claim 11, wherein the projection device comprises a light source capable of emitting a light beam, an imaging device capable of imaging the sequence of images and a headlamp capable of projecting the sequence of images onto the roadway.

14. Projection system according to claim 12, comprising an imager capable of capturing an image of the driver of the motor vehicle and in which the processing unit is capable of searching for the position of the driver in the captured image and of defining the transformation matrix (M) from the determined position of the driver.

15. Projection method according to claim 3, wherein the projection method comprises a step of adding at least one area of shadow to said at least one selected image such that the pictogram is perceived in 3D by said driver.

16. Projection method according to claim 4, wherein said animation shows the pictogram increasing in size.

17. Projection method according to claim 2, wherein said animation shows a displacement movement of the pictogram.

18. Projection method according to claim 2, wherein said animation comprises an over-intensification or under-intensification of at least a portion of an image of the sequence of images.

19. Projection method according to claim 2, wherein the event is an event chosen from an approaching junction, dangerous bend, speed bump and motorway exit.

20. Projection method according to claim 2, wherein the detection device is a geographical location device of the vehicle in which the event is an indication of the path to be followed in order to complete a route selected by the driver.

* * * * *